(12) United States Patent
Juen et al.

(10) Patent No.: US 8,704,768 B2
(45) Date of Patent: Apr. 22, 2014

(54) IMAGE PROCESSING APPARATUS AND METHOD

(71) Applicant: Nikon Corporation, Tokyo (JP)

(72) Inventors: Masahiro Juen, Yokohama (JP); Kenji Toyoda, Chigasaki (JP); Osamu Ikeda, Yokohama (JP); Hisato Ide, Ageo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/675,692

(22) Filed: Nov. 13, 2012

(65) Prior Publication Data

US 2013/0120255 A1  May 16, 2013

Related U.S. Application Data

(63) Continuation of application No. 13/243,535, filed on Sep. 23, 2011, now abandoned, which is a continuation of application No. 12/898,570, filed on Oct. 5, 2010, now abandoned, which is a continuation of application No. 12/100,186, filed on Apr. 9, 2008, now abandoned, which is a continuation of application No. 11/118,430, filed on May 2, 2005, now abandoned, which is a continuation of application No. 09/741,042, filed on Dec. 21, 2000, now abandoned, which is a continuation of application No. 09/492,182, filed on Jan. 27, 2000, now abandoned, which is a continuation of application No. 08/994,756, filed on Dec. 19, 1997, now abandoned.

(30) Foreign Application Priority Data

Dec. 20, 1996  (JP) .................................... 8-341636

(51) Int. Cl.
*G06F 3/033* (2013.01)

(52) U.S. Cl.
USPC ........ 345/158; 345/156; 345/173; 178/18.01; 463/37; 463/38; 348/114; 348/141; 348/207.1; 348/840; 348/333.05

(58) Field of Classification Search
CPC ....... G06F 9/00; G06F 3/033; G06F 3/03547; G06F 3/0425; G06F 3/14; G06F 2203/0339
USPC .............. 345/156–158, 173–179; 463/37–38; 178/18.01–18.09; 348/114, 141, 207.1, 348/840, 333.05, 564, 751
See application file for complete search history.

(56) References Cited

U.S. PATENT DOCUMENTS

| | | |
|---|---|---|
| 5,119,079 A | 6/1992 | Hube et al. |
| 5,194,862 A | 3/1993 | Edwards |
| 5,428,417 A | 6/1995 | Lichtenstein |

(Continued)

*Primary Examiner* — Lun-Yi Lao
*Assistant Examiner* — Md Saiful A Siddiqui
(74) *Attorney, Agent, or Firm* — Miles & Stockbridge P.C.

(57) ABSTRACT

An image processing apparatus provided with a display unit for displaying an operation picture, showing control indicia (e.g., icons) corresponding to multiple image processing functions, is operated to display the operation picture on an external display device. The operator selects one of the indicia shown on the external display device by operating an input device, such as touch screen of the apparatus or a remote control, to indicate the position of the desired one of the indicia. The operator can thereby quickly and reliably select an image processing function to be executed, without any need to view an operation picture on the display unit when making the selection.

9 Claims, 13 Drawing Sheets

(56) References Cited

U.S. PATENT DOCUMENTS

| | | |
|---|---|---|
| 5,491,510 A | 2/1996 | Gove |
| 5,648,760 A | 7/1997 | Kumar |
| 5,724,106 A | 3/1998 | Autry et al. |
| 5,729,289 A | 3/1998 | Etoh |
| 5,845,282 A | 12/1998 | Alley et al. |
| 5,956,020 A | 9/1999 | D'Amico et al. |
| 5,982,429 A | 11/1999 | Kamamoto et al. |
| 6,181,381 B1 | 1/2001 | Evans |
| 6,266,045 B1 | 7/2001 | Myerson et al. |
| 6,597,400 B2 | 7/2003 | Nishimura |

# IMAGE PROCESSING APPARATUS AND METHOD

CROSS-REFERENCE TO RELATED APPLICATIONS

This application claims the benefit of U.S. Provisional Application No. 60/050,849, filed Jun. 26, 1997, which is incorporated herein by reference.

This application also claims the priority of Japanese Patent Application No. 08-341636 filed Dec. 20, 1996, also incorporated herein by reference.

BACKGROUND OF THE INVENTION

1. Field of the Invention

The present invention relates to an image processing apparatus including a display unit on which an operation picture having indicia corresponding to a plurality of image processing functions is displayed, and to an operating method of such an apparatus, wherein image processing to be executed is selected by an external operation for entering a corresponding position on the display unit.

2. Related Background Art

In recent years, electronic cameras as one form of image processing apparatus provided with a display unit for displaying a photographed image have been practically used. Also, multi-functional electronic cameras have been developed, in view of a wide variety of operator's demands, wherein a list, of a plurality of functions is displayed on the display unit, permitting the operator to select a desired function by means of a touch screen.

FIG. 12 is a block diagram of such a multi-functional electronic camera.

In FIG. 12, a control unit 50 is connected, through a control bus 52, to an image pickup unit 54, a recording and reproducing unit 56, a video display processing unit 58, an editing unit 60, an overlay processing unit 62, a frame memory 64 for an operation picture, a display unit 66, and a touch screen 68.

In the electronic camera thus constructed, the control unit 50 performs timing control, through the control bus 52, with respect to the image pickup unit 54, recording and reproducing unit 56, video display processing unit 58, editing unit.60, overlay processing unit 62, frame memory 64 for the operation picture, display unit 66, and touch screen 68.

The image pickup unit 54 transmits a still image: or a movie image (both hereinafter referred simply as "image"), to the recording and reproducing unit 56 and video display processing unit 58.

The recording and reproducing unit 56 compresses the image provided by the image pickup unit 54, and writes the compressed image into a recording medium, such as a magnetic disk. The recording and reproducing unit 56 also reads out the image recorded in the recording medium, decompresses or expands it, and transmits the decompressed image to the editing unit 60.

The video display processing unit 58 processes the image provided by the image pickup unit 54 by converting its pixel density, so as to produce an image to be projected on a finder portion F in a camera window, which is included in an operation picture OP displayed on the display unit 66, as shown in FIG. 13, and transmits the image to the overlay processing unit 62.

The frame memory 64 for the operation picture stores a predetermined image displayed in the form of windows, including a window menu bar (not shown) and icons (corresponding to a RECORD button, an EDIT button and others in this example), which are included in the operation picture displayed on the display unit 66. This image displayed in the form of windows is transmitted to the overlay processing unit 62 with the timing directed by the control unit 50.

The overlay processing unit 62 superimposes or overlays the image of the finder, received from the video display processing unit 58, on the image displayed as windows that is received from the frame memory 64, so as to produce the operation picture (more precisely, an image signal representing the operation picture) which is in turn transmitted to the display unit 66.

The display unit 66 displays the operation picture provided by the overlay processing unit 62.

A position on the display unit 66 is entered through the touch screen 68, which is operated by an operator who touches the screen 68 (pushes down the screen with a pen-like device or directly pushes down the screen).

The control unit 50 specifies an icon displayed at the position entered through the touch screen 68, among the icons on the operation picture, and instructs respective units of the camera to carry out the processing represented by the specified icon. Where the icon located at the above position is the RECORD button, for example, the control unit 50 instructs the recording and reproducing unit 56 to record the image.

Thus, by displaying a plurality of icons corresponding to respective functions, such as image recording and image editing, on the display unit 66, the processing of a selected function can be achieved when the operator selects the corresponding icon through the touch screen 68.

While the electronic camera is provided with many functions as described above, it is desirable that the size and weight of the electronic camera be small. This means that the size of the display unit 66 must be limited. To accommodate this limitation, an external display device of larger size (such as a television) may be used for displaying an image similar to the image displayed on the display unit 66, to allow the operator to confirm details of a photographed image or an image to be edited.

Even if an image similar to that on the display unit 66 is displayed on a larger external display device as mentioned above, however, the operator still needs to select an icon through the touch screen 68, referring to the operation picture displayed on the display unit 66. In such case, because of the small size of the display unit 66 and touch screen 68, the desired icon may not be easily and quickly specified by the operator, or an icon close to the desired icon may be pushed down by mistake, resulting in a poor efficiency of operation.

SUMMARY OF THE INVENTION

It is therefore an object of the present invention to provide an image processing apparatus which is adapted to display an operation picture on an external display device, and to enable the operator to surely select the processing to be executed without referring to the operation picture displayed on a display unit of the apparatus.

Briefly stated, in one of its broader aspects, the present invention provides an imaging processing apparatus comprising an operation picture producing portion which produces an operation picture containing indicia corresponding to a plurality of image processing functions among which a selection can be made by an operator; an image display unit; an output unit which outputs the operation picture to an external display device; a position input portion which inputs a position designated by the operator on the operation picture displayed on the external display device; an identifying portion which identifies a selected image processing function, among the plurality of image processing functions, based on the designated position input by the position input portion; and an image processing portion which carries out the selected image processing function. In a preferred form of the apparatus, the position input portion includes a touch-responsive unit having a portion placed over a screen of the image display unit, and the position input portion has a first operating mode to input a position designated by the operator via the touch-responsive unit on the operation picture displayed on the image display unit and a second operating mode to input a position designated by the operator, on the operation picture displayed on the external display device, via the touch-responsive unit or a remote control which provides a signal to the position input portion.

By providing for selection among the plurality of image processing functions by position designation on the operation picture displayed on the external display device, the image processing apparatus of the invention allows the operator to quickly and reliably select an image processing function to be executed, without any need for the operator to view an operation picture on the display unit of the apparatus when making the selection.

The foregoing and additional aspects of the invention, as well as its various features and advantages, will be better understood from the following detailed description taken in conjunction with the accompanying drawings.

DETAILED DESCRIPTION OF THE INVENTION

Figure 1:
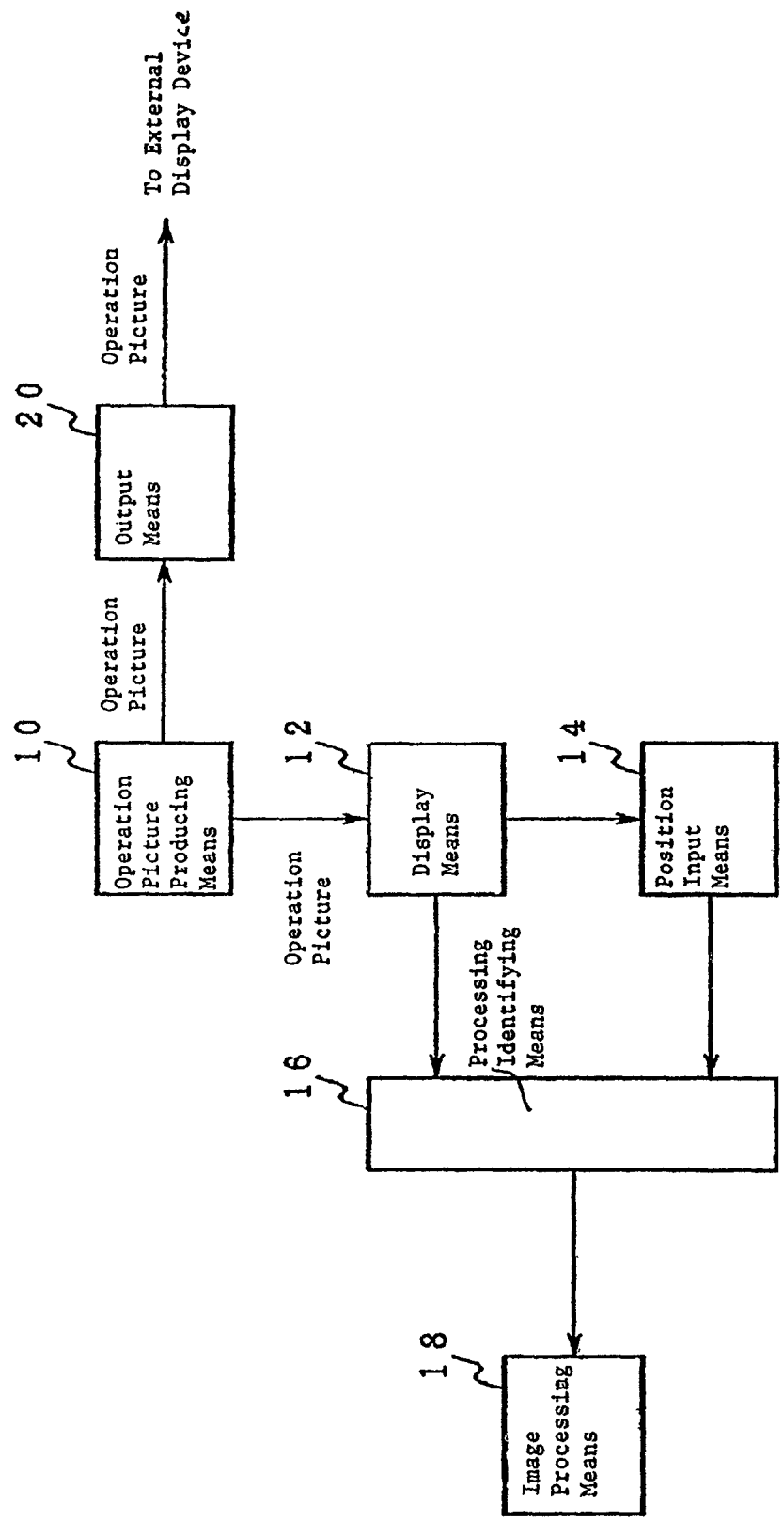
FIG. 1 is a block diagram of a first embodiment of the invention.

FIG. 1 is a block diagram of a first embodiment of the invention.

The image processing apparatus of FIG. 1 comprises operation picture producing means 10 for producing an operation picture including indicia corresponding to a plurality of image processing functions that can be selected by an external operation; display means 12 for displaying the operation picture; position input means 14 placed over a screen of the display means 12, for detecting a touch operation as the external operation, and entering a position designated by the touch operation as an absolute position on the operation picture displayed on the display means; processing identifying means 16 for identifying a corresponding image processing function from the plurality of image processing functions, based on the position on the operation picture that is entered through the position input means 14; and image processing means 18 for carrying out the image processing function identified by the processing identifying means 16, with respect to an image provided to the apparatus. The image processing apparatus additionally comprises output means 20 for outputting the operation picture produced by the operation picture producing means 10 to an external display device, and is characterized in that when the operation picture is transmitted to the external display device through the output means 20, the position input means 14 enters the position designated by the touch operation as a relative position on the operation picture displayed on the external display device.

In the image processing apparatus of FIG. 1, the operation picture produced by the operation picture producing means 10 is displayed on the display means 12, and transmitted via the output means 20 to the external display device and displayed on the display device.

When the operation picture is displayed only on the display means 12, the position input means 14 enters the position designated by the touch operation as an absolute position on the operation picture. Where the operation picture is displayed on the external display device, the position input means 14 permits the touch operation for pointing to a position on the operation picture on the external display device, which position is entered as a relative position on the operation picture.

Since a relative position with respect to a position designated by the operator is indicated on the operation picture displayed on the external display device, desired image processing can be surely selected, and the operating efficiency will not be deteriorated even if the size of the display means 12 is reduced.

Figure 2:
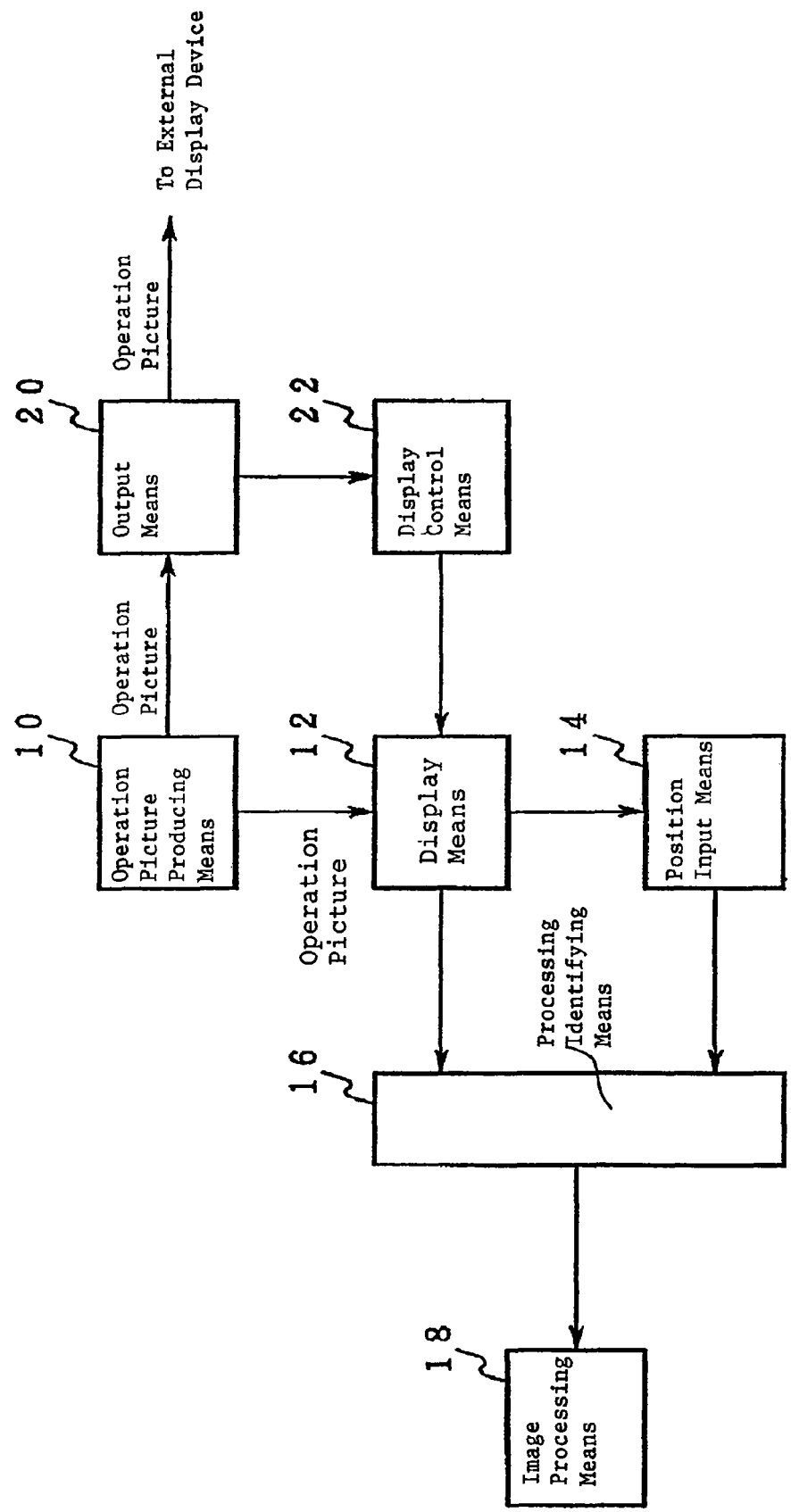
FIG. 2 is a block diagram of a second embodiment of the invention.

FIG. 2 is a block diagram of a second embodiment of an image processing apparatus according to the invention.

In the image processing apparatus as shown in FIG. 2, the apparatus of FIG. 1 is additionally provided with display control means 22 for turning off a display of the operation picture on the display means 12 when the operation picture is output to the external display device through the output means 20.

The display control means 22 turns off or eliminates display of the operation picture on the display means 12 when the operation picture is output to the external display device through the output means 20.

Accordingly, when the relative position on the operation picture displayed on the external display device is entered through the position input means 14, the operation picture is not displayed on the display means 12, thus preventing the operator from being confused by a display provided on the display means 12 in which the position is entered as the absolute position.

Further, by turning off the display of the operation picture on the display means. 12, the operator is surely informed of the fact that the external operation to be performed through the position input means 14 is intended for designating a relative position on the operation picture displayed on the external display device.

Figure 3:
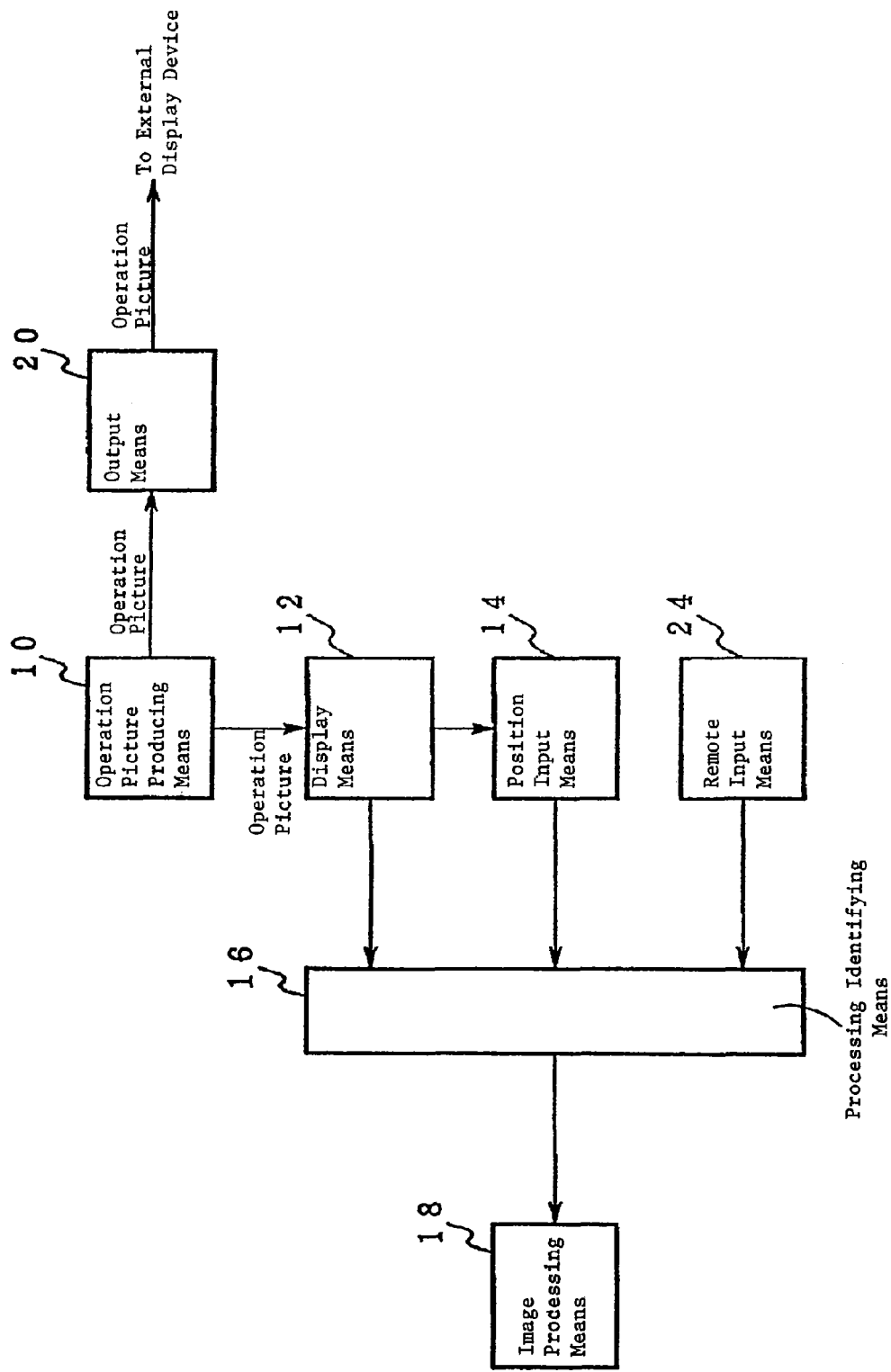
FIG. 3 is a block diagram of a third embodiment of the invention.

FIG. 3 is a block diagram of a third embodiment of an image processing apparatus according to the invention. In the image processing apparatus as shown in FIG. 3, the apparatus of FIG. 1 is additionally provided with remote input means 24 for allowing the external operation also to be performed by a remote operation, so as to enter the position designated by the remote operation as a relative position on the operation picture displayed on the external display device. The processing identifying means 16 identifies a corresponding image processing from the plurality of image processing functions, based on the position on the operation picture that is entered through the remote input means 24.

The remote input means 24 permits the external operation, for entering a position on the operation image displayed on the external display device as a relative position, to be performed by a remote operation.

Since a remote controller capable of designating the relative position may be used for selecting desired image processing, the selection can be accomplished at a reduced cost compared to a case where a remote controller provided with individual operating parts corresponding to respective image processing functions is used.

It is preferred that when remote operation capability is provided, the apparatus be constructed to allow the external operation to be performed as a touch operation or as a remote operation at the operator's discretion, as in the present embodiment. However, the remote operation capability may be provided without the touch operation capability.

Figure 4:
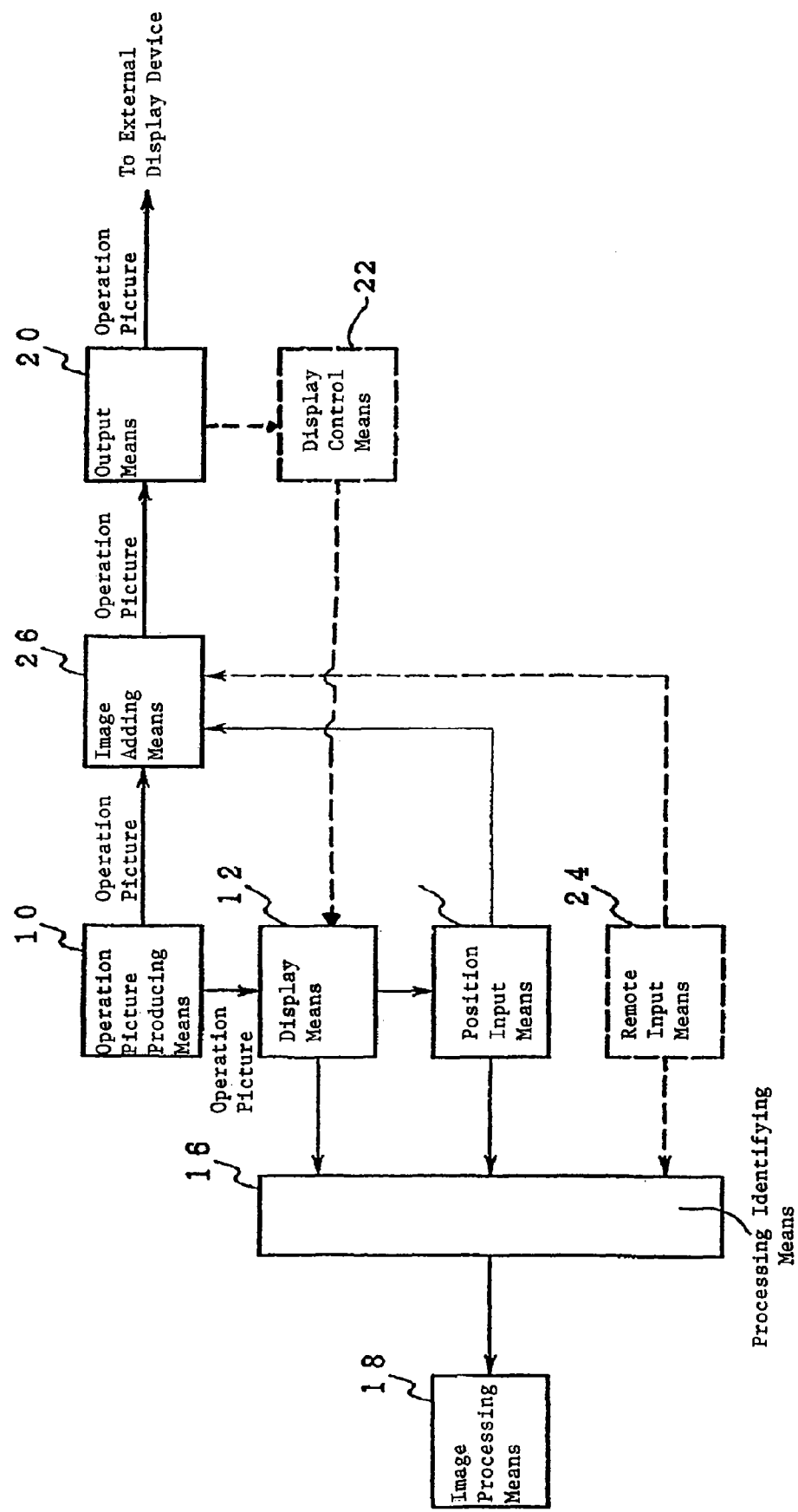
FIG. 4 is a block diagram of a fourth embodiment of the invention.

FIG. 4 is a block diagram of a fourth embodiment of an image processing apparatus according to the invention.

In the image processing apparatus as shown in FIG. 4, the apparatus of FIG. 1, FIG. 2, or FIG. 3 is further provided with image adding means 26 for adding a cursor, indicating the position entered through the position input means 14 or the remote input means 24, to the operation picture produced by the operation picture producing means 10 and supplied to the output means 20.

The image adding means 26 adds a cursor indicating the position entered through the position input means 14 or remote input means 24 to the operation picture produced by the operation picture producing means 10 and transmitted to the output means 20. Thus, the cursor as well as the operation picture is displayed on the external display device, so that the operator can surely recognize the relative position on the operation picture corresponding to the position entered by the operator, and quickly select desired image processing.

Several illustrative implementations of the invention in which the image processing apparatus is constituted by an electronic camera are described below.

Figure 5:
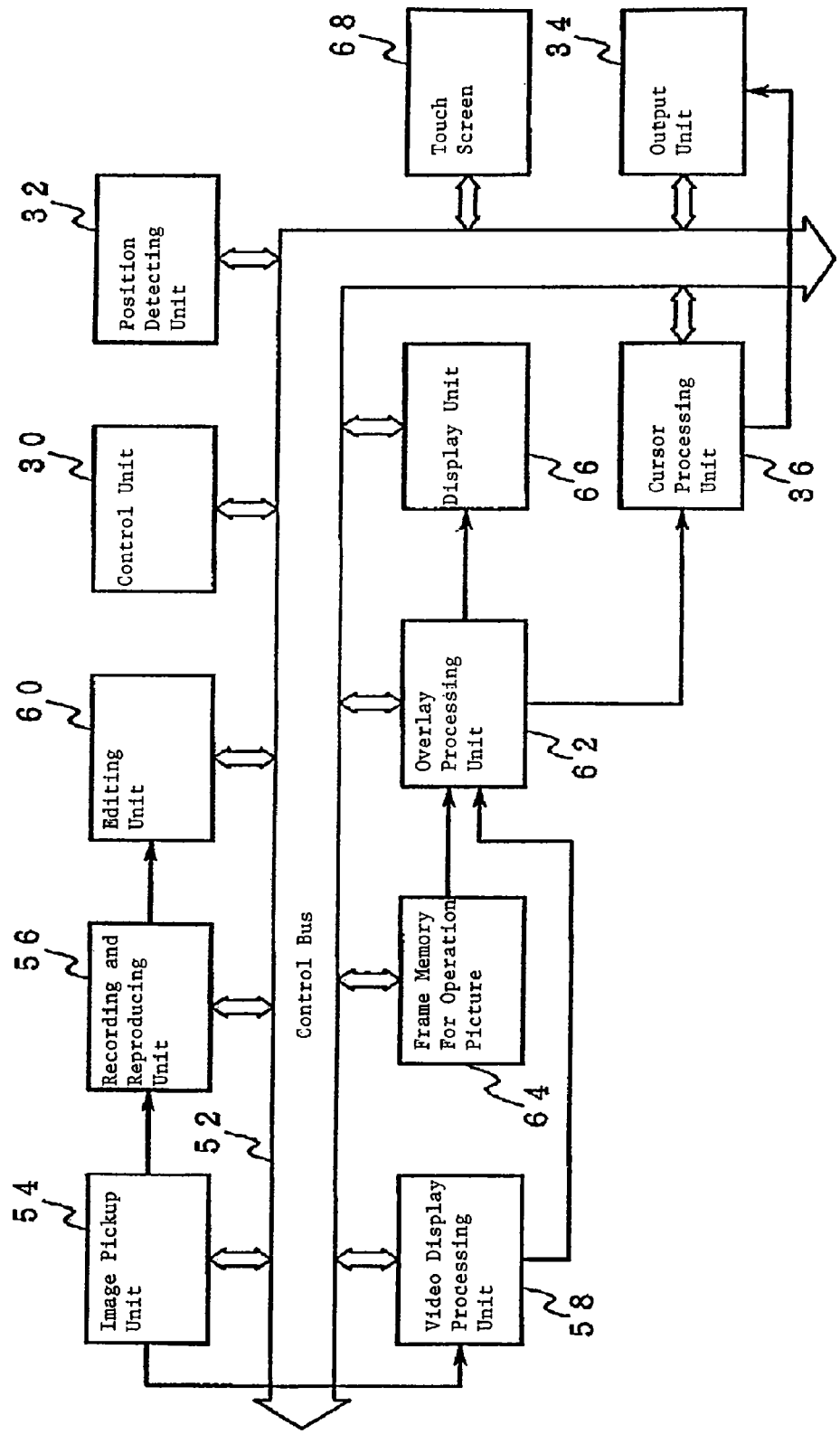
FIG. 5 is a block diagram of an illustrative implementation of the invention in an electronic camera.

FIG. 5 is a block diagram of an electronic camera implementing the principles of the invention according to FIGS. 1, 2, and 4.

In FIG. 5, a control unit 30 is connected, through a control bus 52, to a position detecting unit 32, an output unit 34, a cursor processing unit 36, an image pickup unit 54, a recording and reproducing unit 56, a video display processing unit 58, an editing unit 60, an overlay processing unit 62, a frame memory 64 for an operation picture, a display unit 66, and a touch screen 68.

The data output of the image pickup unit 54 is connected to the data inputs of the recording and producing unit 56 and video display processing unit 58. The data output of the recording and reproducing unit 56 is connected to the data input of the editing unit 60, and the data outputs of the video display processing unit 58 and frame memory 64 for the operation picture are connected to the data input of the overlay processing unit 62. The data output of the overlay processing unit 62 is connected to the data inputs of the display unit 66 and cursor processing unit 36, and the data output of the cursor processing unit 36 is connected to the data input of the output unit 34.

Figure 12:
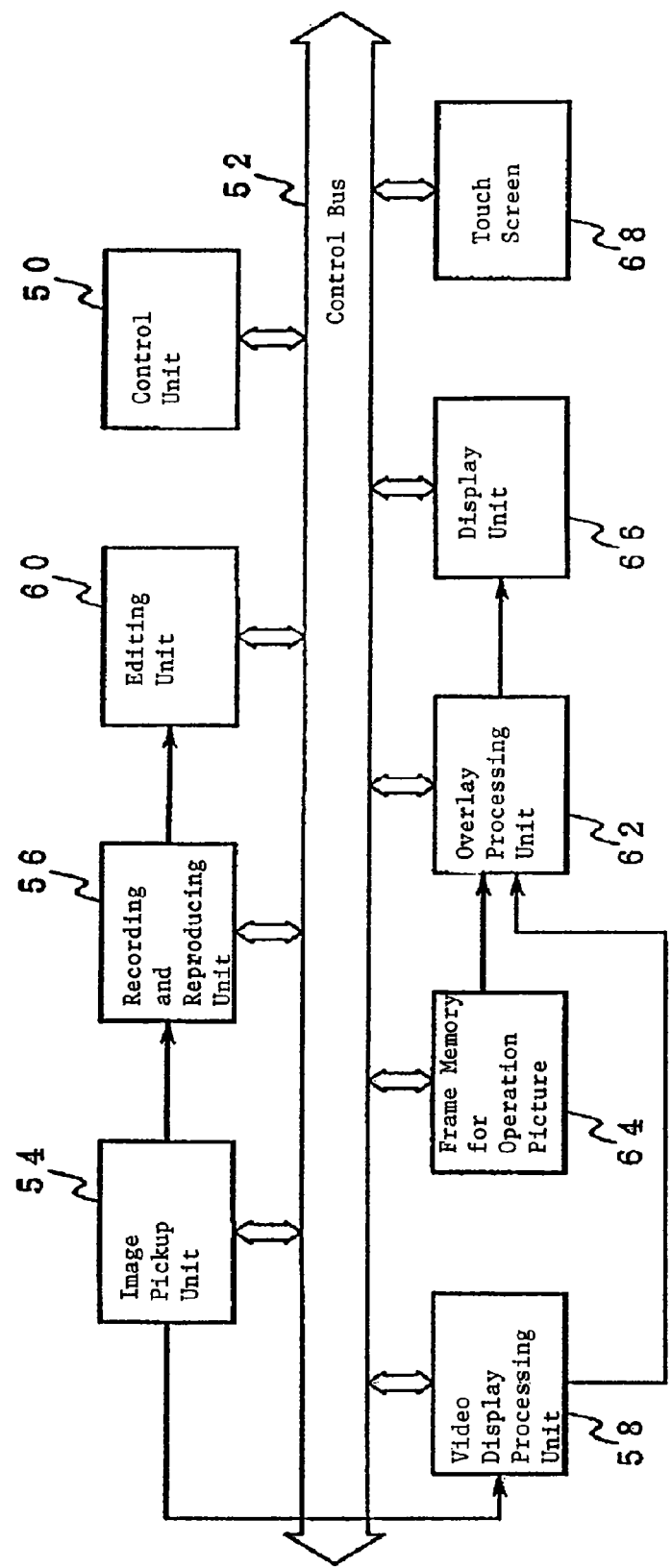
FIG. 12 is a block diagram of a known electronic camera.
Figure 13:
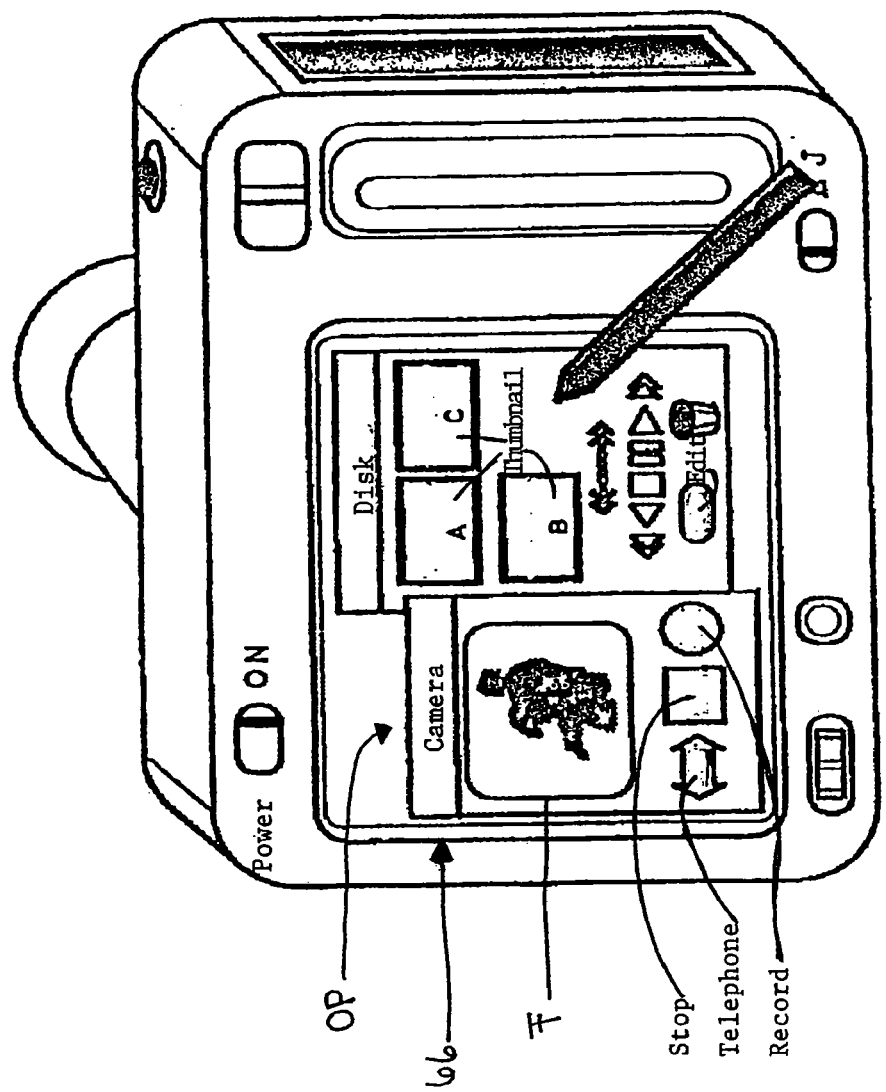
FIG. 13 is a view showing an appearance of the electronic camera of FIG. 12, from the rear, and an example of the display on a display unit.

In FIG. 5, the same reference numerals as used in the block diagram of FIG. 12 are used for identifying functionally corresponding elements, of which no further explanation will be provided herein.

The construction shown in FIG. 5 is different from that of FIG. 12 in that the control unit 30 is provided in place of the control unit 50 shown in FIG. 12, and in that the position detecting unit 32, output unit 34 and cursor processing unit 36 are newly provided.

With regard to the relationship or correspondence between the block diagrams of FIGS. 1, 2, and 4 and that of FIG. 5, the operation picture producing means 10 corresponds to the video display processing unit 58, frame memory 64 for the operation picture, and overlay processing unit 62. The display means 12 corresponds to the display unit 66, and the position input means 14 corresponds to the touch screen 68 and position detecting unit 32. The processing identifying means 16 and display control means 22 correspond to the control unit 30. The image processing means 18 corresponds to the image pickup unit 54, recording and reproducing unit 56, and editing unit 60. The output means 20 corresponds to the output unit 34, and the image adding means 26 corresponds to the cursor processing unit 36.

Figure 6:
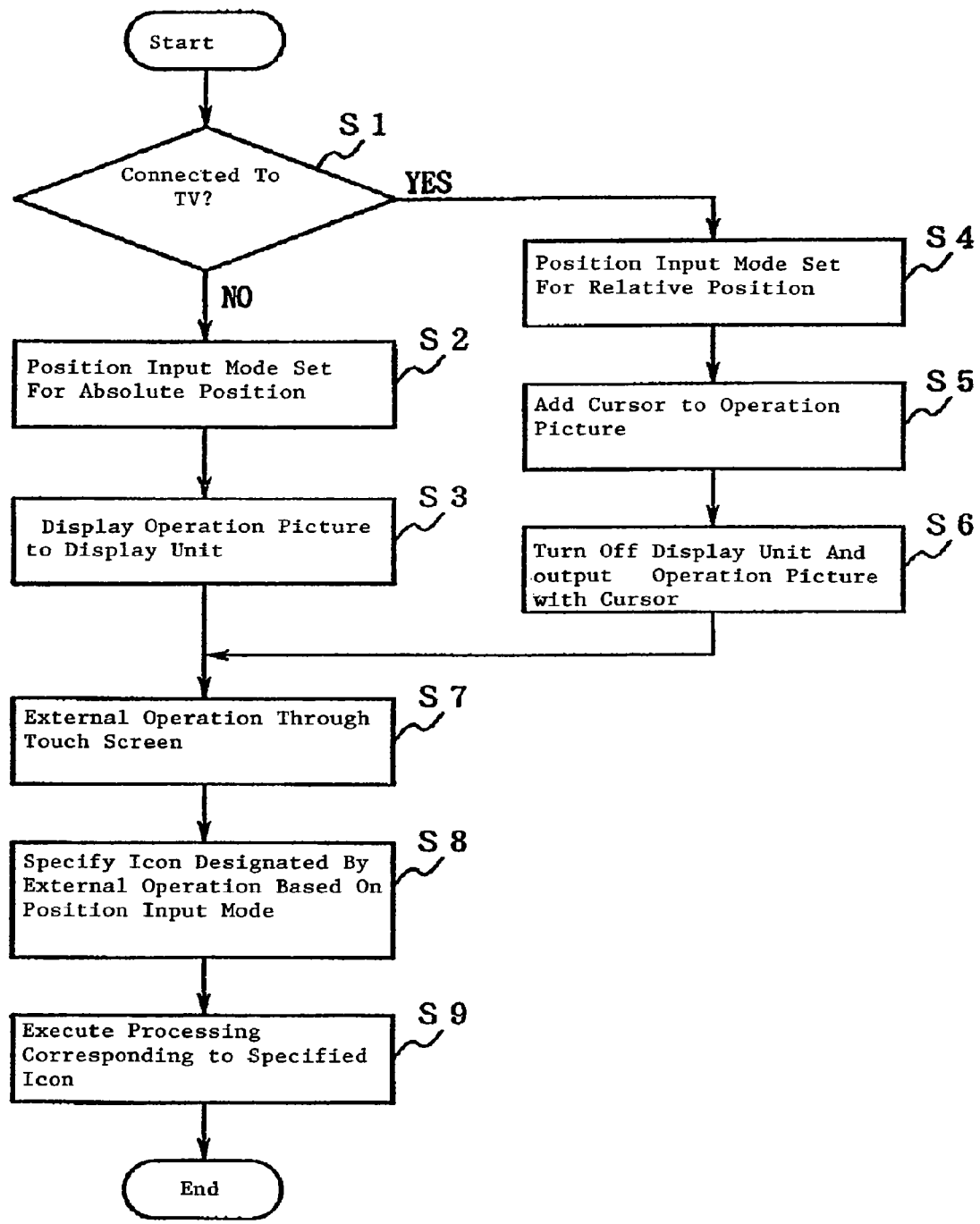
FIG. 6 is a flow chart of the operation of the camera of FIG. 5.
Figure 7:
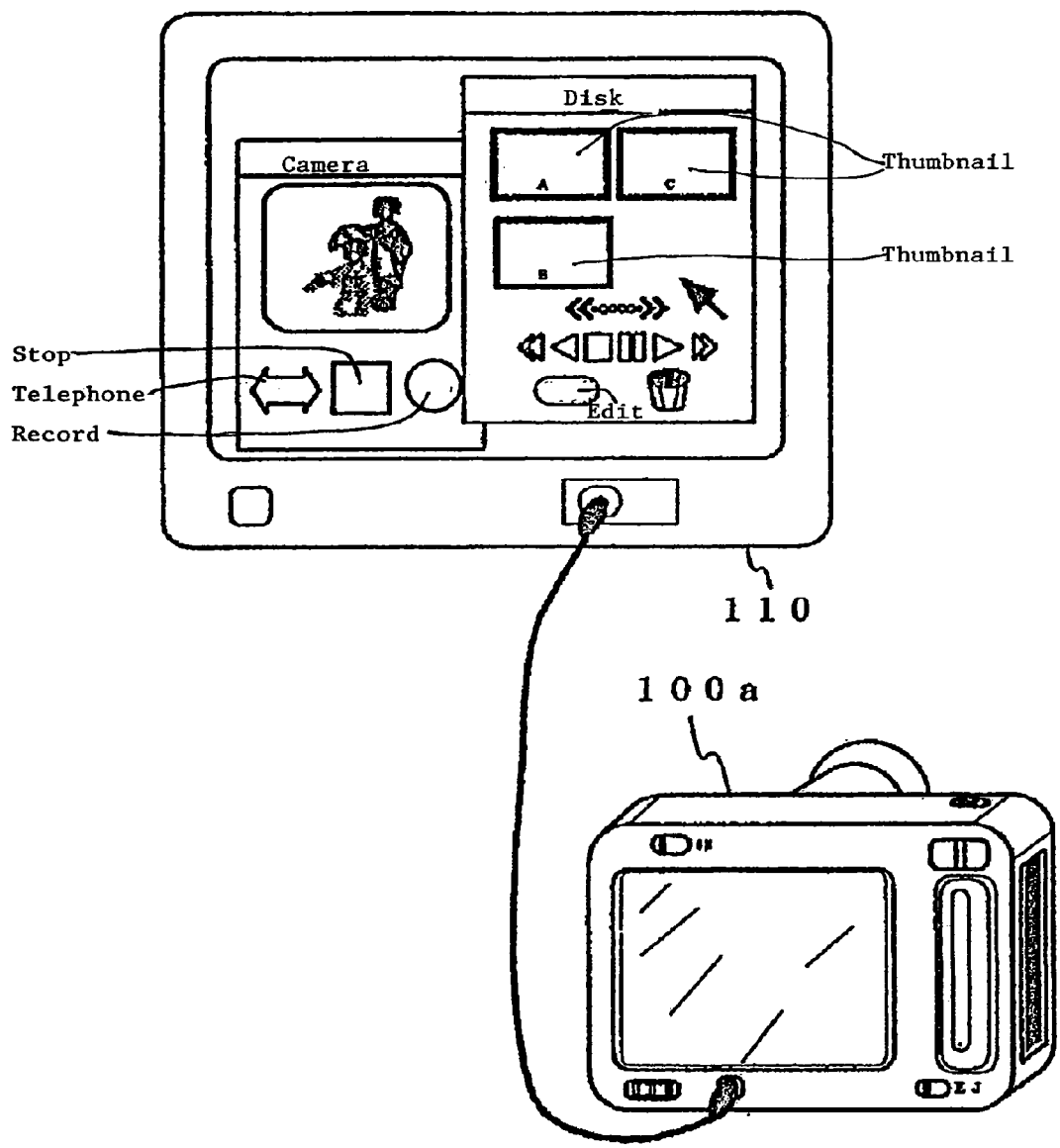
FIG. 7 is a view showing the electronic camera of FIG. 5 connected to a television.

FIG. 6 is a flow chart showing the operation of the electronic camera of FIG. 5, and FIG. 7 is a view showing the camera connected to television. In FIG. 7, the camera is designated as 100a, and the television is designated as 110.

Referring to FIGS. 5-7, the operation of the camera will now be described.

The control unit 30 monitors the condition of a contact point of an image output terminal through the output unit 34, to determine whether a TV (television) is connected to the output terminal (step S1 in FIG. 6).

If the television is not connected to the image output terminal (if NO is obtained in step S1 of FIG. 6), the control unit 30 informs the position detecting unit 32 that a position on the operating picture which is externally designated is entered in a mode (hereinafter referred to as "absolute position input mode") in which the designated position represents or indicates an absolute position on the operating picture (step S2 in FIG. 6). The control unit 30 also instructs respective units to display the operation picture on the display unit 66 in the same manner as in the known example (step S3 in FIG. 6).

If the electronic camera 100a is connected to the television 110 through the output unit 34 as shown in FIG. 7 (if YES is obtained in step S1 of FIG. 6), the control unit 30 informs the position detecting unit 32 that a position that is externally designated is entered in a position input mode (hereinafter referred to as "relative position input mode") in which the designated position indicates a relative position on the operating picture (step S4 in FIG. 6), and also instructs the cursor processing unit 36 to add a cursor to the operation picture (step S5 in FIG. 6).

Further, the control unit 30 instructs the display unit 66 to turn off its light source, and instructs the output unit 34 to transmit the operation picture, to which the cursor is added, to the television 110 (step S6 in FIG. 6). At the same time, the control unit 30 informs the cursor processing unit 36 of the position on the operation picture to which the cursor is to be added (hereinafter referred simply as "cursor position").

The initial value of the cursor position is set in a main memory of the control unit 30 upon its start, and the cursor position is updated if the position detecting unit 32 obtains a new position on the operation picture which is established by an external operation, as described later.

The cursor processing unit 36 retrieves the operation picture (produced by the overlay processing unit 62 in the same manner as in the known example) in response to a command from the control unit 30, and it stores the retrieved operation picture in an internal frame memory (not shown). The cursor processing unit 36 also superimposes an image of an oblique arrow, representing a cursor, on the operation picture stored in its frame memory and outputs the resulting image to the output unit 34.

The operation picture to which the cursor is added in the above manner is output to the television 110 through the output unit 34, and is displayed on a display screen of the television 110.

When the operation picture is displayed on the display unit 66 or on the display screen of the television 110, the control unit 30 instructs the touch screen 68 to receive information entered by an external operation (step S7 in FIG. 6), and instructs the position detecting unit 32 to specify an icon designated by the external operation (step S8 in FIG. 6). When the position input mode is the relative position input mode, the control unit 30 informs the position detecting unit 32 of the cursor position stored in the main memory, and instructs this unit 32 to update the cursor position.

The touch screen 68 allows the external operation to be performed thereon, and the position designated by the external operation is entered through the touch screen 68.

When the position input mode is the absolute position input mode, the position detecting unit 32 assumes that the position on the display unit 66 is the same as the position on the operation picture, and specifies the icon located at the position entered through the touch screen 68. The position detecting unit 32 also informs the control unit 30 of an identification code of the icon thus specified.

When the position input mode is the relative position input mode, the position detecting unit 32 serially receives the position entered through the touch screen 68, and measures displacement (corresponding to relative position) of the received position per unit time (for example, frame rate of the television 110). The position detecting unit 32 also adds a vector indicative of the measured displacement to the cursor position provided by the control unit 30, so as to update the cursor position, and informs the control unit 30 of the updated cursor position.

If a command to move the cursor is not generated for a given time while the icon is present at the cursor position, or if the icon is clicked (by pressing the touch screen), the position detecting unit 32 determines that the selection of the icon is completed, and informs the control unit 30 of the identification code of the selected icon.

Upon receipt of the identification code of the selected icon from the position detecting unit 32, the control unit 30 instructs respective units of the camera to execute the processing represented by the icon (step S9 in FIG. 6).

Each time the control unit 30 is informed by the position detecting unit 32 of the cursor position, the cursor position stored in its main memory is updated. When the cursor position is updated in this manner, the control unit 30 instructs the cursor processing unit 36 and output unit 34 to add the updated cursor to the operation picture, and output the resulting image to the television 110.

In the present implementation as described above, where the electronic camera is connected to the television 110 through the output unit 34, the external operation performed on the touch screen 68 is regarded as a command to move the cursor on the operation picture displayed on the display screen of the television 110. Accordingly, the operator can select a desired icon without fail by operating the touch screen 68 while referring to the operation picture displayed on the display screen of the TV 110, so as to achieve a desired amount of movement of the cursor on the display screen.

While the operation picture is displayed either on the display unit 66 or the display screen of the television 110 in the camera just described, the construction may, of course, be made such that the operation picture may be displayed on the display unit 66 as well as the display screen of the television 110 when the electronic camera is connected to the television 110.

Figure 8:
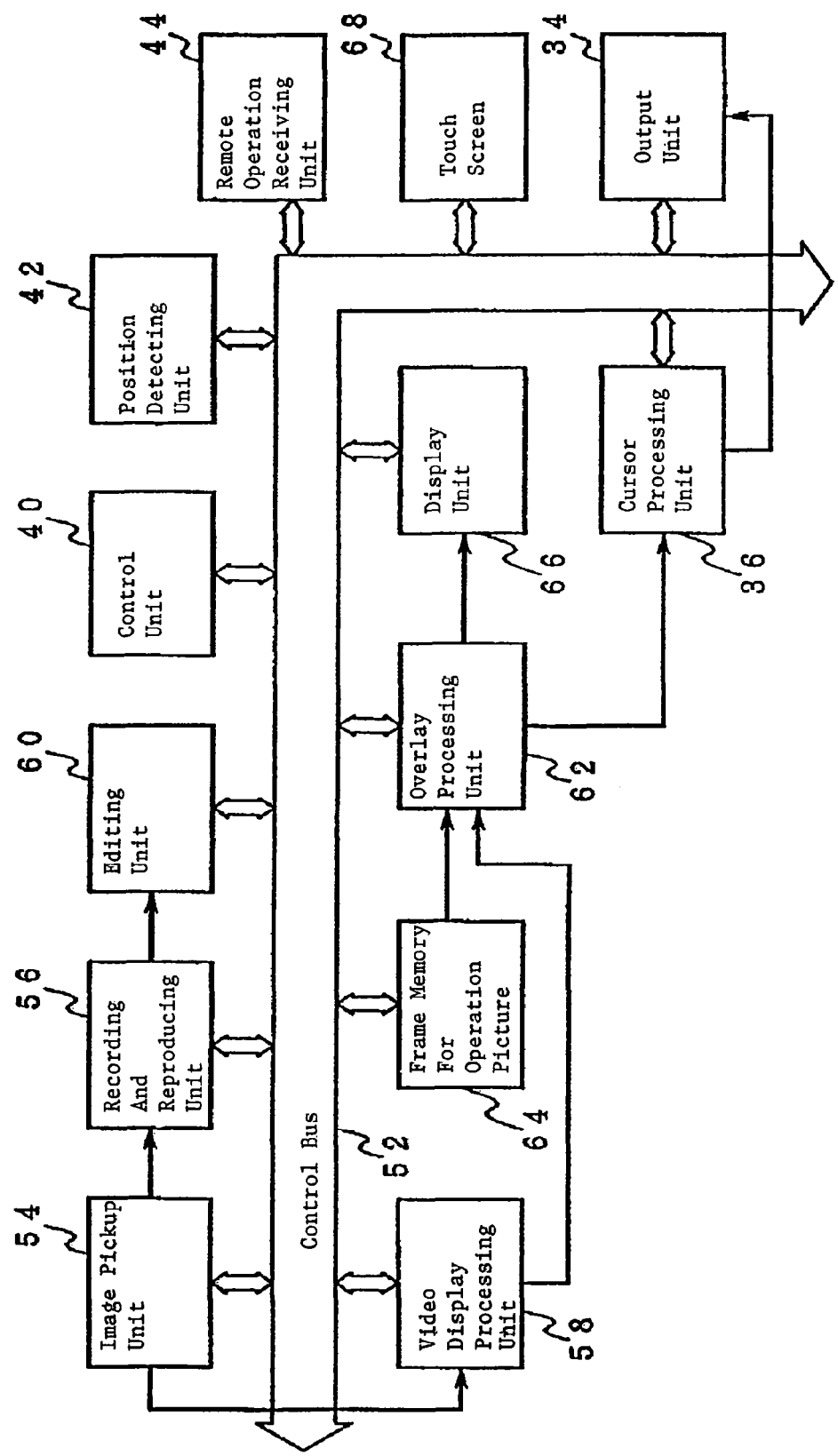
FIG. 8 is a block diagram of another implementation of the invention in an electronic camera.

FIG. 8 is a block diagram of an electronic camera implementing the principles of the invention according to FIGS. 1, 3, and 4. In FIG. 8, the same reference numerals as used in the block diagram of FIG. 5 are used for identifying functionally corresponding elements, of which no further explanation will be provided herein.

The construction shown in FIG. 8 is different from that of FIG. 5 in that a control unit 40 and a position detecting unit 42 are provided in place of the control unit 30 and position detecting unit 32, and further in that a remote operation receiving unit 44 connected to the control unit 40 through the control bus 52 is provided.

With regard to the relationship or correspondence between the block diagrams of FIGS. 1, 3, and 4 and that of FIG. 8, the operation picture producing means 10 corresponds to the video display processing unit 58, frame memory 64 for storing the operation picture, and overlay processing unit 62. The display means 12 corresponds to the display unit 66, and the position input means 14 corresponds to the touch screen 68 and position detecting unit 42. The processing identifying means 16 corresponds to the control unit 40, and the image processing means 18 corresponds to the image pickup unit 54, recording and reproducing unit 56 and editing unit 60. The output means 20 corresponds to the output unit 34, the remote input means 24 corresponds to the remote operation receiving unit 44, and the image adding means 26 corresponds to the cursor processing unit 36.

Figure 9:
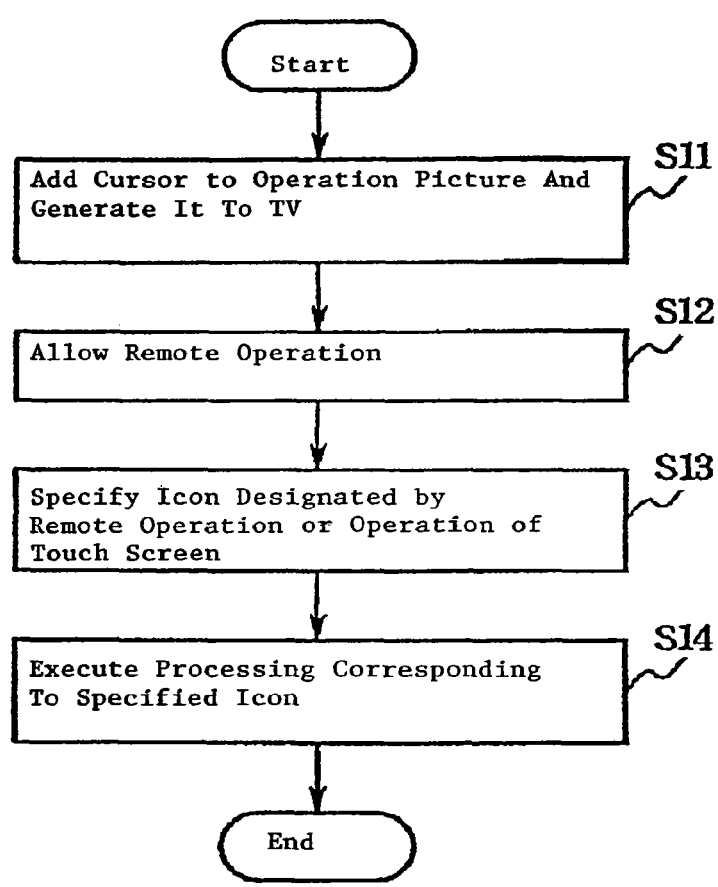
FIG. 9 is a flow chart of an operation sequence of the camera of FIG. 8.
Figure 10:
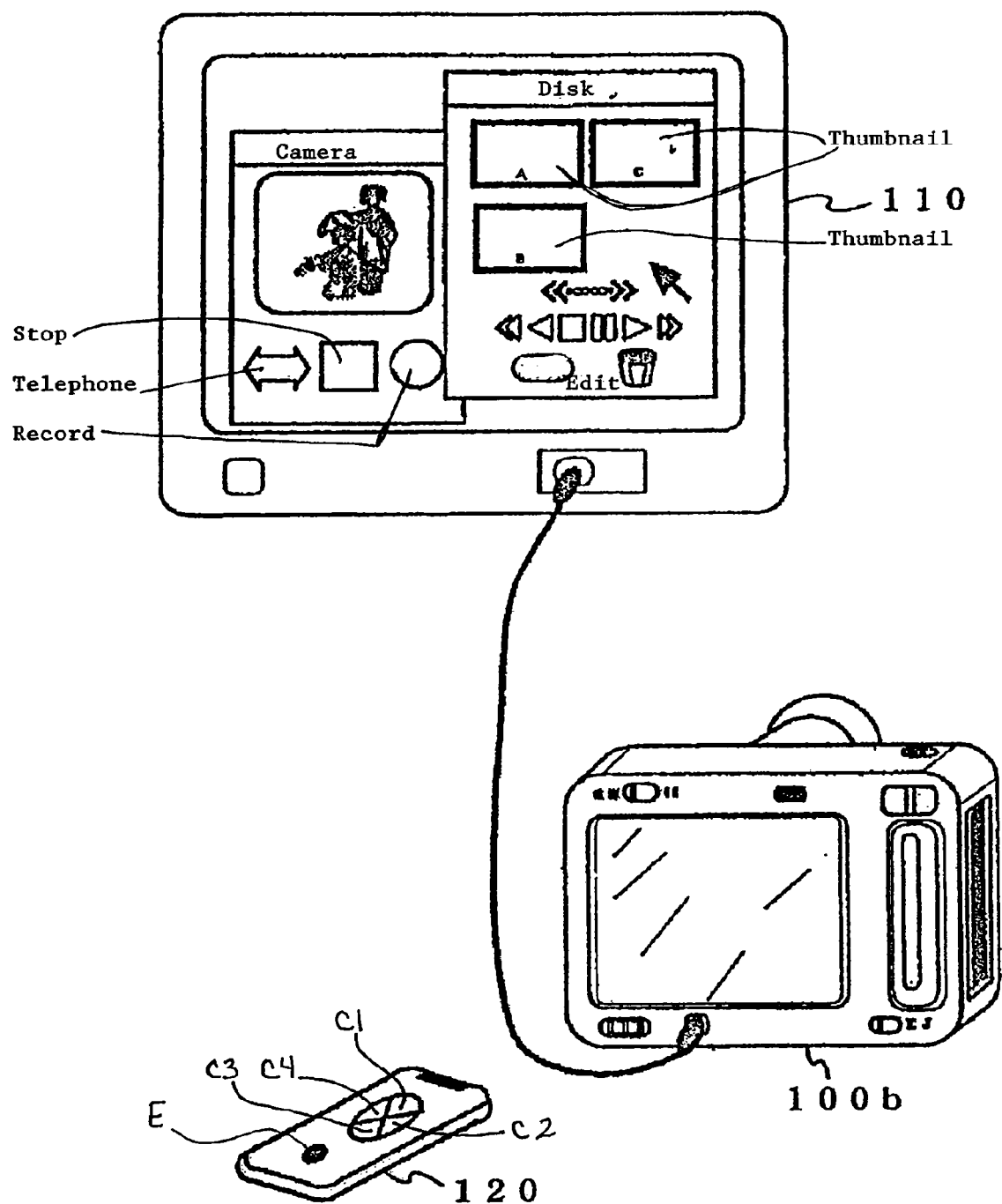
FIG. 10 is a view showing the electronic camera of FIG. 8 connected to a television.

FIG. 9 is a flow chart showing the operation of the electronic camera of FIG. 8 in the relative position input mode. FIG. 10 is a view showing the camera connected to a television. In FIG. 10, the camera is designated as 100b, and the television is designated as 110. A remote control 120 for the camera is also shown.

Referring to FIGS. 8-10, the operation of the camera in the relative position input mode will now be explained. The operation in the absolute position input mode is the same as that in the camera of FIG. 5.

The control unit 40 determines whether the electronic camera 100b is connected to the television 110 through the output unit 34, in the same manner as in the camera of FIG. 5. If the control unit 40 determines that the electronic camera is connected to the television 110 as shown in FIG. 10, the control unit 40 instructs the cursor processing unit 36 and the output unit 34 to add a cursor to the operation picture and output the resulting image to the television 110 (step S11 in FIG. 9), in the same manner as in the camera of FIG. 5.

At this time, the control unit 40 informs the cursor processing unit 36 of the cursor position. The initial value of the cursor position is set in a main memory of the control unit 40 upon its start, and is updated if the position detecting unit 42 obtains a new cursor position on the operation picture which is established by a remote operation, as described later.

The cursor processing unit 36 superimposes an image of an oblique arrow, representing the cursor, on the operation picture produced by the overlay processing unit 62, and outputs the resulting image to the output unit 34, in the same manner as in the camera of FIG. 5.

The operation picture to which the cursor is added in the above manner is output to the television through the output unit 34, and is displayed on a display screen of the television 110.

When the operation picture is displayed on the display screen of the television 110 in this manner, the control unit 40 instructs the remote operation receiving unit 44 to allow a remote operation to be performed thereon (step S12 in FIG. 9), and instructs the position detecting unit 42 to specify an icon designated either by the remote operation or by operation of the touch screen (step S13 in FIG. 9). At the same time, the control unit 40 informs the position detecting unit 42 of the cursor position stored in the main memory, and instructs the detecting unit 42 to update the cursor position.

In addition to allowing position entry based on operation of the touch screen as previously described in connection with the position detecting unit 32 and control unit 30 of FIG. 5, the position detecting unit 42 and control unit 40 allow position entry based on the remote operation. Of course, the relative position detection capability based on operation of the touch screen may be omitted if desired, but this will reduce the operating flexibility of the system.

The remote operation is performed using the remote controller 120 shown in FIG. 10. The remote controller 120 is provided with four buttons C1-C4 (hereinafter referred to as "cursor move" buttons) for indicating up, right, down, and left directions of movement of the cursor, respectively, and a button E (hereinafter referred to as "execute" button) for executing the processing represented by the icon pointed to by the cursor. This remote controller 120 produces an electric signal representing an identification code corresponding to the button pushed down by the operator, converts the electric signal into an infrared signal, and transmits the infrared signal.

The remote operation receiving unit 44 receives the infrared signal transmitted by the remote controller 120 in the above manner, coverts it into an electric signal, and gives the identification code of the button corresponding to the electric signal to the position detecting unit 42.

The position detecting unit 42 reads the identification code of the button given by the remote operation receiving unit 44 for every unit time (for example, the frame rate of the television 110), and serially specifies the type of the button that has been pushed down.

Where the position detecting unit 42 determines that one of the cursor move buttons C1-C4 has been pushed down, this unit 42 updates the cursor position based on the direction and amount (corresponding to relative position) of movement of the cursor that are entered with the button. The position detecting unit 42 also informs the control unit 40 of the cursor position thus updated.

When the position detecting unit 42 determines that the execute button E has been pushed down, this unit 42 informs the control unit 40 of the identification code of the icon located at the cursor position.

Upon receipt of the identification code of the icon from the position detecting unit 42, the control unit 40 instructs respective units of the camera to carry out the processing represented by the icon (step S14 in FIG. 9).

Accordingly, the operator can surely select a desired icon by operating the remote controller 120 while referring to the operation picture displayed on the display screen of the TV 110, so as to achieve desired direction and amount of movement of the cursor.

While an infrared signal is used as the medium for transmitting the identification code of the button selected on the remote controller 120, any medium, such as an ultrasonic wave, etc. may be used, provided that the identification code can be surely received by the remote operation receiving unit 44.

While the remote operation is conducted by means of the remote controller 120 provided with the cursor move buttons in the present implementation, the remote controller 120 may take any form or configuration, provided that the direction and amount of movement of the cursor can be surely designated.

Figure 11:
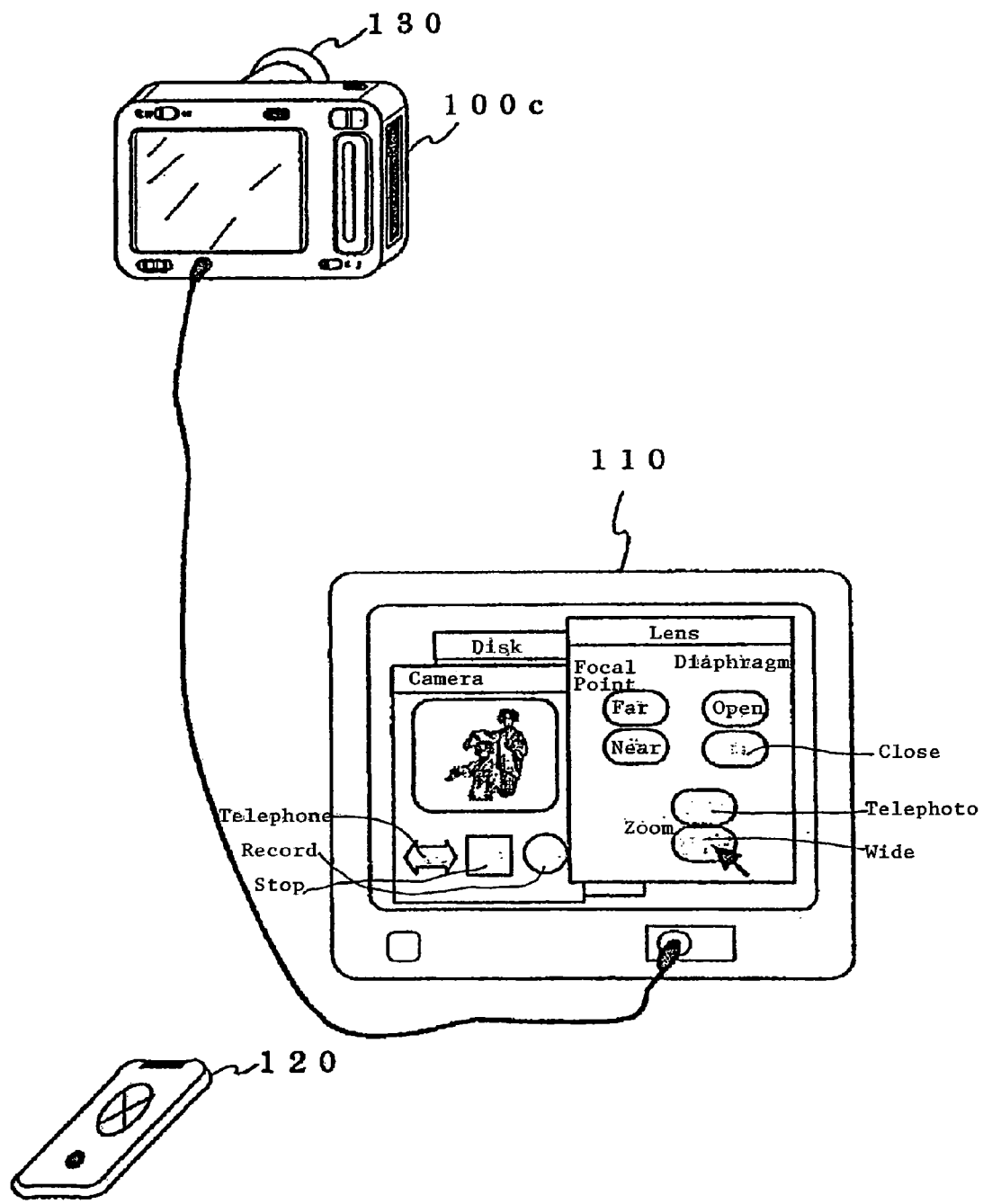
FIG. 11 is a view showing another electronic camera of the invention connected to a television.

While the processing performed by the image pickup unit 54, recording and reproducing unit 56 and editing unit 60 is executed by the remote operation in the present implementation, the electronic camera may be additionally provided with such functions as controlling zooming of a zoom lens, controlling the state of a diaphragm, and controlling the focal point of the lens. The additional functions may be accessible via, for example, a window or windows selectable from the window menu bar of the operation picture. FIG. 11 shows an example of an operation picture displayed on TV 110 by a camera 110c having a zoom lens 130, the operating picture including a "Lens" window with control icons for the aforementioned functions. These icons are selectable by operation of the cursor with, at the user's discretion, the remote control 120 or the touch screen 68.

While the position input mode is set to be the relative position input mode upon connection of the electronic camera to the television 110 in the illustrative implementations, a select switch may be provided on a case, for example, to allow the operator to select the position input mode.

While the cursor in the form of an oblique arrow is added to the operation picture in the illustrative implementations, an I-shaped or cross-shaped cursor, or a cursor having any other shape may be used.

Of course, a cursor need not be displayed, provided that the position designated by the operator can be surely indicated or recognized in some other manner. For example, the color of the icon located at the position designated by the external operation may be changed.

Although an electronic camera is used as the image processing apparatus in the illustrative implementations, the present invention may be applied in a similar manner to other types of image processing apparatus that can be connected to an external display device and achieve desired functions upon selection of icons.

According to the invention as described herein, a relative position with respect to the position designated by the operator is indicated on the operation picture displayed on the external display device, thus enabling the operator to select desired image processing without fail. In this case, the operation efficiency is not deteriorated even if the size of the display of the image processing apparatus is reduced.

Also, in a mode where the relative position on the operation picture displayed on the external display device is entered through the position input means, the display of the operation picture on the display means may be inhibited. Therefore, the operator will not be confused by the operation picture that would be otherwise displayed on the display means in a mode where the position entered by the operator is as the absolute position.

Further according to the invention, the remote controller that is operated to designate a relative position on the operation picture can be used for selecting desired image processing. Such a remote controller can be made at a reduced cost compared to a remote controller having individual operating parts corresponding to respective image processing functions.

Further still, the cursor as well as the operation picture can be displayed on the external display device, so that the operator can surely recognize the relative position on the operation picture corresponding to the position entered by the operator, and quickly select desired image processing.

The image processing apparatus of the invention advantageously allows the operator to quickly and surely select the desired image processing, thus assuring improved reliability and operating efficiency.

It will be appreciated, of course, that numerous variations of the invention are possible in keeping with the basic principles described herein, the scope of the invention being defined in the appended claims.

The invention claimed is:

1. An image processing apparatus, comprising:
   an operation picture producing portion which produces an operation picture containing indicia corresponding to a plurality of image processing functions among which a selection is made by an external operation;
   an image display unit which displays said operation picture;
   an output unit which outputs said operation picture to an external display device;
   a position input portion including a touch responsive unit having a portion placed over a screen of said image display unit, with which an operator can designate a position on the operation picture displayed on the external display device by touch operation;
   an image adding portion which adds a cursor indicating the position entered through said position input portion to the operation picture;
   an identifying portion which identifies a selected image processing function, among said plurality of image processing functions, based on the designated position input by said position input portion;
   an image processing portion which carries out the selected image processing function; and
   a determining portion which determines whether the external display device is connected to said output unit,
   wherein, when said determining portion determines that the external display device is not connected to said output unit, said position input portion operates in a first operating mode to enter a position designated by the touch operation as an absolute position on the operation picture displayed on said image display unit, the position of the external operation being the same as the position on the operation picture displayed on said image display unit, and when said determining portion determines that the external display device is connected to said output unit, the operation picture with the cursor is output to the external display device through said output unit, said image display unit does not display said operation picture, and the position input portion operates in a second operating mode to enter the position designated by the touch operation as a relative position, wherein, in the second operating mode, the position input portion measures displacement of the position designated by the touch operation per unit time, and adds a vector indicative of the measured displacement to a previous cursor position to determine a next cursor position.

2. An image processing apparatus as defined in claim 1, wherein said position input portion is constructed to input a position designated by the operator, on the operation picture displayed on the external display device, with a remote control which provides a signal to said position input portion.

3. An image processing apparatus as defined in claim 1, wherein said position input portion has the first operating mode to input a position designated by the operator via said touch-responsive unit on the operation picture displayed on said image display unit, and the second operating mode to input a position designated by the operator via said touch-responsive unit on the operation picture displayed on the external display device.

4. An image processing apparatus as defined in claim 3, wherein said position input portion is constructed to input a position designated by the operator, on the operation picture displayed on the external display device, with a remote control which provides a signal to the position input portion.

5. An image processing apparatus as defined in claim 1, and which is constituted by an electronic camera.

6. An operating method of an image processing apparatus having an image display unit and an output unit which is to be connected to an external display device, said method comprising:
   producing an operation picture containing indicia corresponding to a plurality of image processing functions among which a selection is made;
   outputting the operation picture to the external display device;
   inputting a position designated by an operator by performing a touch operation of a touch-responsive unit having a touch portion placed over a screen of said image display unit;
   adding a cursor indicating the position designated by the operator on the operation picture displayed on the external display device;
   identifying a selected image processing function, among said plurality of image processing functions, based on the input position;
   performing the selected image processing function; and
   determining whether the external display device is connected to said output unit,
   wherein, when it is determined that the external display device is not connected to said output unit, the operation picture is displayed on the image display unit and the position of the touch operation is the same as the position on the operation picture displayed on said image display unit, and when it is determined that the external display device is connected to said output unit, the operation picture with the cursor is displayed on the external display device, the image display unit does not display said operation picture, and displacement of the position designated by the touch operation per unit time is measured and a next cursor position of the operation picture is determined by adding a vector indicative of the measured displacement to a previous cursor position.

7. A method as defined in claim 6, wherein said position is designated by the operator with a remote control unit which provides a signal to the image processing apparatus.

8. A method as defined in claim 6, wherein said inputting constitutes one of two selectable inputting modes, the other of said inputting modes including inputting a position designated by the operator on the operation picture displayed on said image display unit.

9. A method as defined in claim 6, wherein said image processing apparatus is an electronic camera.

* * * * *